United States Patent
Weng et al.

(10) Patent No.: US 8,806,086 B2
(45) Date of Patent: Aug. 12, 2014

(54) SERIAL PORT CONNECTION CIRCUIT AND SERVER

(75) Inventors: Cheng-Fei Weng, Shenzhen (CN); Jie Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 308 days.

(21) Appl. No.: 13/332,382

(22) Filed: Dec. 21, 2011

(65) Prior Publication Data

US 2013/0089160 A1  Apr. 11, 2013

(30) Foreign Application Priority Data

Oct. 11, 2011 (CN) .......................... 2011 1 0306235

(51) Int. Cl.
*G06F 3/00* (2006.01)
*G06F 13/12* (2006.01)
*G06F 5/00* (2006.01)

(52) U.S. Cl.
USPC .................................. 710/38; 710/36; 710/64

(58) Field of Classification Search
None
See application file for complete search history.

(56) References Cited

U.S. PATENT DOCUMENTS

2011/0307639 A1* 12/2011 Dai ................................. 710/106
2012/0144180 A1* 6/2012 Tang ................................ 713/2

* cited by examiner

*Primary Examiner* — Zachary K Huson
(74) *Attorney, Agent, or Firm* — Novak Druce Connolly Bove + Quigg LLP

(57) ABSTRACT

A server includes a baseboard management controller (BMC), an input/output (I/O) chip, a serial port, and a serial port connection circuit. The serial port connection circuit is connected to the BMC, the I/O chip, and the serial port, and selectively connects either the BMC or the I/O chip to the serial port.

14 Claims, 2 Drawing Sheets

SERIAL PORT CONNECTION CIRCUIT AND SERVER

BACKGROUND

1. Technical Field

The present disclosure relates to serial port connection circuits, and particularly to a serial port connection circuit with high compatibility and a server using the serial port connection circuit.

2. Description of Related Art

Serial ports are widely used in electronic devices, such as servers. For example, baseboard management controllers (BMCs) and input/output (I/O) chips of servers can be electrically connected to other electronic devices via serial ports. Serial ports for BMCs are mostly incompatible with serial ports for I/O chips. Therefore, many servers may need various serial ports for the BMCs and the I/O chips, respectively, which may adversely affect miniaturization of the servers and increase cost of the servers.

Therefore, there is room for improvement within the art.

BRIEF DESCRIPTION OF THE DRAWINGS

Many aspects of the present disclosure can be better understood with reference to the following drawings. The components in the various drawings are not necessarily drawn to scale, the emphasis instead being placed upon clearly illustrating the principles of the present disclosure. Moreover, in the drawings, like reference numerals designate corresponding parts throughout the figures.

DETAILED DESCRIPTION

Figure 1:
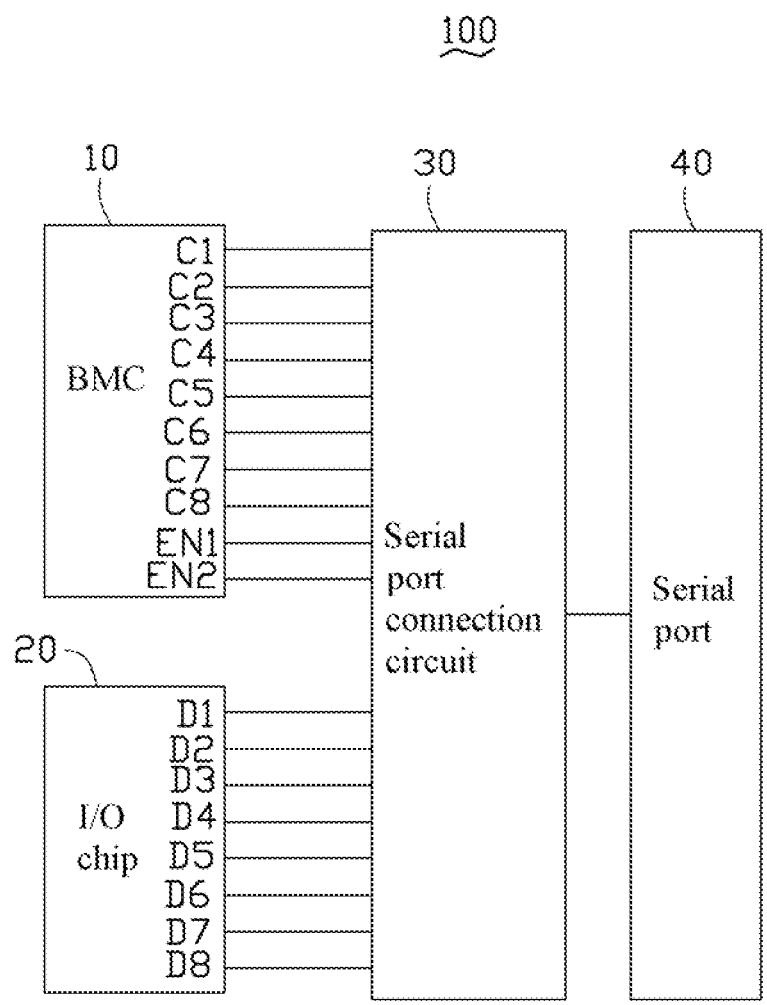
FIG. 1 is a block diagram of a server, according to an exemplary embodiment.
Figure 2:
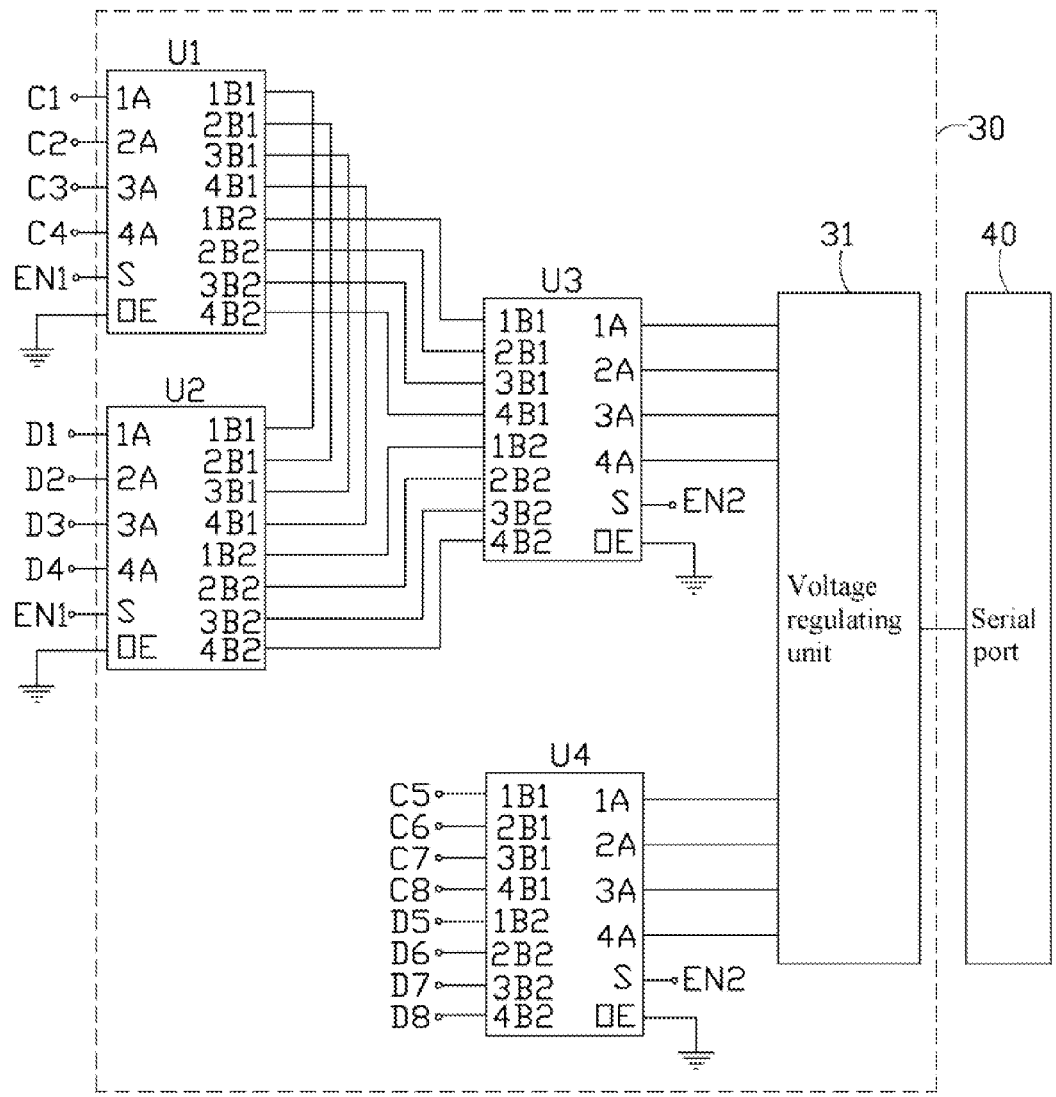
FIG. 2 is a circuit diagram of the server shown in FIG. 1.

FIG. 1 and FIG. 2 show a server 100 according to an exemplary embodiment. The server 100 includes a baseboard management controller (BMC) 10, an input/output (I/O) chip 20, a serial port connection circuit 30, and a serial port 40. Both the BMC 10 and the I/O chip 20 are electrically connected to the serial port 40 via the serial port connection circuit 30. Thus, the serial port connection circuit 30 can selectively connect the BMC 10 or the I/O chip 20 to the serial port 40, such that the BMC 10 and the I/O chip 20 can be selectively connected to other electronic devices via the serial port 40.

The BMC 10 can be a typical BMC used in electronic devices. The BMC 10 includes a first enabling pin EN1, a second enabling pin EN2, and a plurality of data transmission pins. In this embodiment, the BMC 10 includes eight data transceiving pins C1-C8. The I/O chip 20 can be a typical I/O chip used in electronic devices. The I/O chip 20 also includes a plurality of data transceiving pins. In this embodiment, the I/O chip 20 includes eight data transceiving pins D1-D8.

The serial port connection circuit 30 includes a first data transmission unit U1, a second data transmission unit U2, a third data transmission unit U3, and a fourth data transmission unit U4, which are all multiple selectors. In this embodiment, each of the four data transmission units U1, U2, U3, U4 includes four first data transmission pins 1A-4A, four second data transmission pins 1B1-4B1, four third data transmission pins 1B2-4B2, a first selection control pin S, and a second selection control pin OE. The first selection control pins S of the first and second data transmission units U1, U2 are both electrically connected to the first enabling pin EN1. The first selection control pins S of the third and fourth data transmission units U3, U4 are both electrically connected to the second enabling pin EN2. The second selection control pins OE of the data transmission units U1, U2, U3, U4 are all grounded.

The data transceiving pins C1-C4 of the BMC 10 are correspondingly electrically connected to the first data transmission pins 1A-4A of the first data transmission unit U1. The data transceiving pins C5-C8 of the BMC 10 are correspondingly electrically connected to the second data transmission pins 1B1-4B1 of the fourth data transmission unit U4. The data transceiving pins D1-D4 of the I/O chip 20 are correspondingly electrically connected to the first data transmission pins 1A-4A of the second data transmission unit U2. The data transceiving pins D5-D8 of the I/O chip 20 are correspondingly electrically connected to the third data transmission pins 1B2-4B2 of the fourth data transmission unit U4. The second data transmission pins 1B1-4B1 of the first data transmission unit U1 are correspondingly electrically connected to the second data transmission pins 1B1-4B1 of the second data transmission unit U2. The third data transmission pins 1B2-4B2 of the first data transmission unit U1 are correspondingly electrically connected to the second data transmission pins 1B1-4B1 of the third data transmission unit U3. The third data transmission pins 1B2-4B2 of the second data transmission unit U2 are correspondingly electrically connected to the third data transmission pins 1B2-4B2 of the third data transmission unit U3.

The serial port connection circuit 30 further includes a voltage regulating unit 31, such as an adapter or other voltage converters. The first data transmission pins 1A-4A of the third data transmission unit U3 and the first data transmission pins 1A-4A of the fourth data transmission unit U4 are all electrically connected to the voltage regulating unit 31, and the voltage regulating unit 31 is electrically connected to the serial port 40.

In this embodiment, in each of the data transmission units U1, U2, U3, U4, the first data transmission pins 1A-4A are selectively connected to the second data transmission pins 1B1-4B1 or the third data transmission pins 1B2-4B2 according to logic statuses of the first selection control pin S and the second selection control pin OE. In particular, when both the first selection control pin S and the second selection control pin OE are at logic 0, the data transmission unit allows data transmission between the first data transmission pins 1A-4A and the second data transmission pins 1B1-4B1. When the first selection control pin S is at logic 1 and the second selection control pin OE is at logic 0, the data transmission unit allows data transmission between the first data transmission pins 1A-4A and the third data transmission pins 1B2-4B2. When the first selection control pin S is at logic 0 and the second selection control pin OE is at logic 1, or both the first selection control pin S and the second selection control pin OE are at logic 1, the data transmission unit prohibits through data transmission.

In use, when the BMC 10 needs to be electrically connected to other electronic devices (e.g., debug devices) via the serial port connection circuit 30 and the serial port 40, the first enabling pin EN1 is set at logic 1, and the second enabling pin EN2 is set at logic 0. Thus, the first selection control pins S of the first and second data transmission units U1, U2 are set at logic 1, and the first selection control pins S of the third and fourth data transmission units U3, U4 are set at logic 0. Because the second selection control pins OE of all of the data transmission units U1, U2, U3, U4 are all grounded, that is, always set at logic 0, the first and second data transmission units U1, U2 respectively allow data transmission between their first data transmission pins 1A-4A and their third data transmission pins 1B2-4B2, and the third and fourth data transmission units U3, U4 respectively allow data transmission between their first data transmission pins 1A-4A and their second data transmission pins 1B1-4B1. In this way, the data transceiving pins C1-C4 of the BMC 10 can transmit data to and receive data from the serial port 40 via the first data transmission unit U1 and the third data transmission unit U3 connected in series, and the data transceiving pins C5-C8 of the BMC 10 can transmit data to and receive data from the serial port 40 via the fourth data transmission unit U4. The voltage regulating unit 31 can regulate voltages of the data transmitted between the BMC 10 and the serial port 40. At the same time, data transmission between the I/O chip 20 and the serial port 40 and data transmission between the I/O chip 20 and the BMC 10 are both prohibited.

When the I/O chip 20 needs to be electrically connected to other electronic devices (e.g., external devices such as mice, keypads, and printers) via the serial port connection circuit 30 and the serial port 40, both the first enabling pin EN1 and the second enabling pin EN2 are set at logic 1. Thus, the first selection control pins S of the data transmission units U1, U2, U3, U4 are all set at logic 1. Because the second selection control pins OE of the data transmission units U1, U2, U3, U4 are all always set at logic 0, each of the data transmission units U1, U2, U3, U4 allows data transmission between the first data transmission pins 1A-4A and the third data transmission pins 1B2-4B2. In this way, the data transceiving pins D1-D4 of the I/O chip 20 can transmit data to and receive data from the serial port 40 via the second data transmission unit U2 and the third data transmission unit U3 connected in series, and the data transceiving pins D5-D8 of the I/O chip 20 can transmit data to and receive data from the serial port 40 via the fourth data transmission unit U4. The voltage regulating unit 31 can regulate voltages of the data transmitted between the I/O chip 20 and the serial port 40. At the same time, data transmission between the BMC 10 and the serial port 40 and data transmission between the BMC 10 and the I/O chip 20 are both prohibited.

Furthermore, when the first enabling pin EN1 is set at logic 0, the data transceiving pins C1-C4 of the BMC 10 can transmit data to and receive data from the data transceiving pins D1-D4 of the I/O chip 20 via the first data transmission pins 1A-4A and the second data transmission pins 1B1-4B1 of the first data transmission unit U1, and the second data transmission pins 1B1-4B1 and the first data transmission pins 1A-4A of the second data transmission unit U2. In this way, the BMC 10 and the I/O chip 20 can be electrically connected to each other and cooperatively establish a Serial over LAN (SoL) function.

The present disclosure enables the BMC 10 and the I/O chip 20 of the server 100 to be selectively connected to other electronic devices via the same serial port 40. Compared with common servers, the server 100 does not need different serial ports configured for respectively connecting the BMC 10 and the I/O chip 20 to other electronic devices, and can have less serial ports. Thus, the present disclosure can achieve further miniaturization and conserve cost.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A serial port connection circuit for selectively connecting either a baseboard management controller (BMC) or an input/output (I/O) chip to a serial port, the serial port connection circuit comprising:
   a first data transmission unit connected to the BMC;
   a second data transmission unit connected to the I/O chip;
   a third data transmission unit connected to the first data transmission unit, the second data transmission unit, and the serial port; and
   a fourth data transmission unit connected to the BMC, the I/O chip, and the serial port;
   wherein the first, second, third, and fourth data transmission units are all multiple selectors, and the serial port is selectively connected to either the BMC or the I/O chip by the first, second, third, and fourth data transmission units; and
   wherein the serial port is connected to the BMC via the first data transmission unit and the third data transmission unit connected in series and further via the fourth transmission unit, and is connected to the I/O chip via the second data transmission unit and the third data transmission unit connected in series and further via the fourth transmission unit.

2. The serial port connection circuit as claimed in claim 1, wherein each of the first, second, third, and fourth data transmission units includes a group of first data transmission pins, a group of second data transmission pins, a group of third data transmission pins, a first selection pin, and a second selection pin; and the first data transmission pins are selectively connected to the second data transmission pins or the third data transmission pins according to logic statuses of the first and second selection control pins.

3. The serial port connection circuit as claimed in claim 2, wherein the first data transmission pins of the first data transmission unit and the second data transmission pins of the fourth data transmission unit are connected to the BMC, and the first data transmission pins of the second data transmission unit and the third data transmission pins of the fourth data transmission unit are connected to the I/O chip.

4. The serial port connection circuit as claimed in claim 3, wherein the third data transmission pins of the first data transmission unit are connected to the second data transmission pins of the third data transmission unit, the third data transmission pins of the second data transmission unit are connected to the third data transmission pins of the third data transmission unit, and the first data transmission pins of both the third data transmission unit and the fourth data transmission unit are connected to the serial port.

5. The serial port connection circuit as claimed in claim 4, wherein the second data transmission pins of the first data transmission unit are connected to the second data transmission pins of the second data transmission unit.

6. The serial port connection circuit as claimed in claim 5, wherein each of the first, second, third, and fourth data transmission units allows data transmission between the first data transmission pins and the second data transmission pins thereof when both the first selection control pin and the second selection control pin thereof are at logic 0, and allows data transmission between the first data transmission pins and the third data transmission pins thereof when the first selection control pin thereof is at logic 1 and the second selection control pin thereof is at logic 0.

7. The serial port connection circuit as claimed in claim 6, wherein the second selection pins of the first, second, third, and fourth data transmission units are all grounded to be always set at logic 0.

8. The serial port connection circuit as claimed in claim 7, wherein the first control selection pins of the first, second, third, and fourth data transmission units are all connected to the BMC to be set at logic 1 or logic 0 by the BMC.

9. The serial port connection circuit as claimed in claim 1, further comprising a voltage regulating unit, wherein both the third and fourth data transmission units are connected to the serial port via the voltage regulating unit.

10. A server, comprising:
a baseboard management controller (BMC);
an input/output (I/O) chip;
a serial port; and
a serial port connection circuit connected to the BMC, the I/O chip, and the serial port;
wherein the serial port connection circuit selectively connects either the BMC or the I/O chip to the serial port; the serial port connection circuit includes a first data transmission unit connected to the BMC, a second data transmission unit connected to the I/O chip, a third data transmission unit connected to the first data transmission unit, the second data transmission unit, and the serial port; and a fourth data transmission unit connected to the BMC, the I/O chip, and the serial port; and the first, second, third, and fourth data transmission units are all multiple selectors, and connect the BMC to the serial port via the first data transmission unit and the third data transmission unit connected in series and further via the fourth transmission unit, or connect the I/O chip to the serial port via the second data transmission unit and the third data transmission unit connected in series and further via the fourth transmission unit.

11. The server as claimed in claim 10, wherein each of the first, second, third, and fourth data transmission units includes a group of first data transmission pins, a group of second data transmission pins, a group of third data transmission pins, a first selection pin, and a second selection pin; and the first data transmission pins are selectively connected to the second data transmission pins or the third data transmission pins according to logic statuses of the first and second selection control pins.

12. The server as claimed in claim 11, wherein the first data transmission pins of the first data transmission unit and the second data transmission pins of the fourth data transmission unit are connected to the BMC, and the first data transmission pins of the second data transmission unit and the third data transmission pins of the fourth data transmission unit are connected to the I/O chip; and the third data transmission pins of the first data transmission unit are connected to the second data transmission pins of the third data transmission unit, the third data transmission pins of the second data transmission unit are connected to the third data transmission pins of the third data transmission unit, and the first data transmission pins of both the third data transmission unit and the fourth data transmission unit are connected to the serial port.

13. The server as claimed in claim 12, wherein the second data transmission pins of the first data transmission unit are connected to the second data transmission pins of the second data transmission unit.

14. The server as claimed in claim 13, wherein each of the first, second, third, and fourth data transmission units allows data transmission between the first data transmission pins and the second data transmission pins thereof when both the first selection control pin and the second selection control pin thereof are at logic 0, and allows data transmission between the first data transmission pins and the third data transmission pins thereof when the first selection control pin thereof is at logic 1 and the second selection control pin thereof is at logic 0.

* * * * *